(No Model.)

H. HOLLAND.
HUB RUNNER FOR CARRIAGES.

No. 344,578. Patented June 29, 1886.

Witnesses.
E. Blanta.
E. L. Sanger.

Inventor.
Harold Holland,
Per C. C. Shaw.
Attorney.

UNITED STATES PATENT OFFICE.

HAROLD HOLLAND, OF LYNN, MASSACHUSETTS.

HUB-RUNNER FOR CARRIAGES.

SPECIFICATION forming part of Letters Patent No. 344,578, dated June 29, 1886.

Application filed April 9, 1886. Serial No. 198,328. (No model.)

*To all whom it may concern:*

Be it known that I, HAROLD HOLLAND, of Lynn, in the county of Essex, State of Massachusetts, have invented a certain new and useful Improvement in Carriages, of which the following is a description sufficiently full, clear, and exact to enable any person skilled in the art or science to which said invention appertains to make and use the same, reference being had to the accompanying drawings, forming part of this specification, in which—

Figure 1:
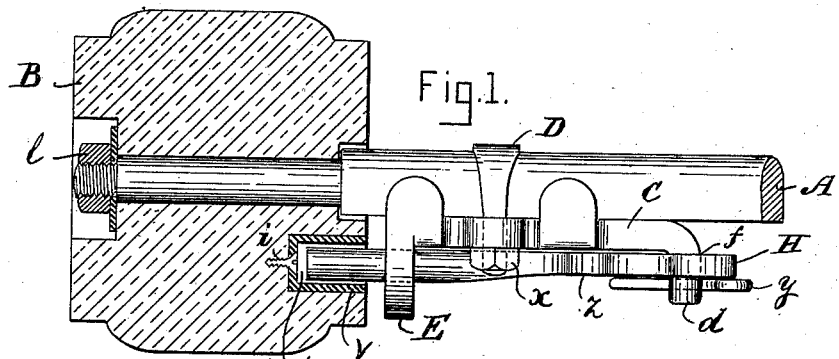
Figure 2:
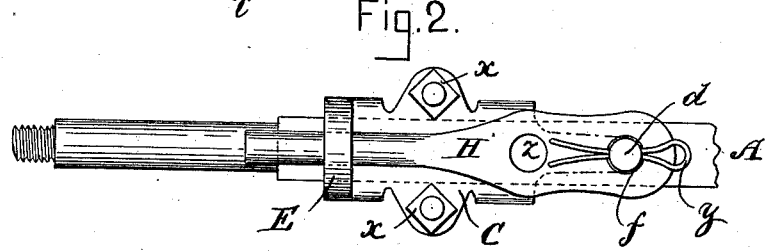
Figure 3:
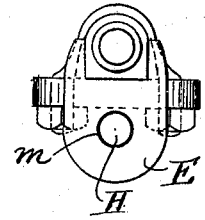
Figure 4:
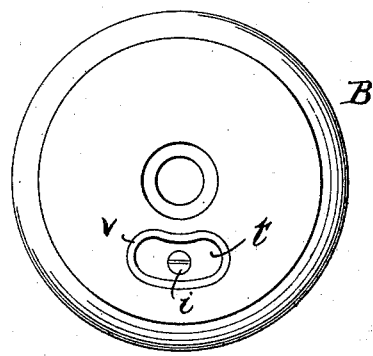

Figure 1 is a diagram representing a portion of the axle of a carriage and hub of a runner embodying my improvement, the axle being shown in side elevation and the hub in vertical longitudinal section; Fig. 2, a bottom plan view of the axle, clip, and bolt with the hub and axle-nut removed; Fig. 3, an end elevation of the parts shown in Fig. 2, and Fig. 4 an end elevation showing the inner end of the hub.

Like letters of reference indicate corresponding parts in the different figures of the drawings.

My invention relates to means for converting a carriage or other wheeled vehicle into a sleigh or enabling the carriage to be mounted on runners; and it consists in the novel construction and arrangement of parts, as hereinafter more fully set forth and claimed, the object being to produce a more effective and desirable device of this character than is now in ordinary use.

The nature and operation of the improvement will be readily understood by all conversant with such matters from the following explanation:

In the drawings, A represents the axle, and B the hub. The axle is provided on its under side with the clip C, which is secured thereto by an ordinary clamp, D, and the nuts $x\ x$. The clamp is provided at its outer end with a downwardly-projecting flange, E, having the hole $m$, and at its inner end with the downwardly-projecting stud $d$. A bolt, H, is fitted to work horizontally in the hole $m$ of the flange E, said bolt being flattened at its inner end, and provided with two holes, $z\ f$, adapted to receive the stud $d$ on the clip C, said stud being fitted with a spring-key, $y$, for securing the bolt thereon, as shown in Figs. 1 and 2.

The hub B is designed to be secured to any suitable runner in the usual manner, it not being deemed essential to show the same in order to illustrate my invention. A curved socket, $t$, is formed in the inner end of the hub, said socket being lined with the metallic lining $v$, which is secured therein by a screw, $i$, passing through its bottom. The object of the socket is to permit the runner to oscillate on the axle in riding over or surmounting obstacles in the road, and at the same time prevent the hub from entirely revolving on the axle.

In the use of my improvement, the wheel of the carriage being removed, the hub B and its runner (not shown) are placed on the axle A, and secured by the nut $l$, the outer end of the bolt H being at the same time inserted in the slot $t$ and secured in position by the stud $d$ and key $y$, as shown in Fig. 1. When the hub B and its runner are removed to replace the wheel, the bolt is withdrawn, the stud $d$ being then inserted in the hole $z$ of said bolt and the bolt secured on the stud by the key $y$, as before described, thus leaving the wheel of the carriage free to revolve without interfering with the bolt.

The clip C and bolt H are designed to be permanently affixed to the axle A for ready use, as required.

As it is sometimes inconvenient to remove the wheels of the carriage and substitute runners provided with hubs, I provide the hubs of the carriage with sockets $t$, thus enabling the ordinary wheels to be mounted on temporary runners or sleds, as occasion requires, without removing them from the axle, and therefore the hub B in the drawings may be considered as representing a hub of the carriage-wheel or a hub of the runner, as the case may be, the socket $t$ being the same in either.

Having thus explained my invention, what I claim is—

1. In a vehicle, an axle and a clip secured to the under side thereof, said clip having a downwardly-projecting flange at its outer end provided with a hole parallel with the body of the clip, and a downwardly-projecting stud at its inner end provided with a lateral perforation, in combination with a bolt sliding in said hole, said bolt being provided with an eye adapted to fit over said stud, substantially as described.

2. In a vehicle, an axle and a clip secured to the under side thereof, said clip having a downwardly-projecting flange at its outer end provided with a hole parallel with the body of the clip, and a downwardly-projecting stud at its inner end provided with a lateral perforation, in combination with a bolt sliding in said hole, said bolt being provided with two eyes in its body adapted to fit over said stud, whereby said bolt may be locked in one of two positions, and a key passing through the perforation in the stud, substantially as described.

3. In a carriage, the axle A, provided with the nut $l$, clamp D, and nuts $x$ $x$, the clip C, provided with the flange E, stud $d$, and key $y$, the bolt H, provided with the holes $z$ $f$, and the hub B, provided with the socket $t$, constructed, combined, and arranged to operate substantially as described.

HAROLD HOLLAND.

Witnesses:
O. M. SHAW,
E. L. SAWYER.